US008583285B2

United States Patent
Aurnhammer et al.

(10) Patent No.: US 8,583,285 B2
(45) Date of Patent: Nov. 12, 2013

(54) METHOD AND DEVICE FOR STOPPING A MANIPULATOR

(75) Inventors: Andreas Aurnhammer, Munich (DE); Markus Eisensehr, Augsburg (DE); Andreas Hagenauer, Friedberg (DE); Manfred Huttenhofer, Meitingen (DE)

(73) Assignee: KUKA Laboratories GmbH, Augsburg (DE)

( * ) Notice: Subject to any disclaimer, the term of this patent is extended or adjusted under 35 U.S.C. 154(b) by 505 days.

(21) Appl. No.: 12/875,351

(22) Filed: Sep. 3, 2010

(65) Prior Publication Data

US 2011/0060462 A1  Mar. 10, 2011

(30) Foreign Application Priority Data

Sep. 4, 2009 (DE) .......................... 10 2009 040 145

(51) Int. Cl.
*G05B 19/04* (2006.01)
*G05B 19/18* (2006.01)

(52) U.S. Cl.
USPC ................................. 700/255; 901/2; 901/19

(58) Field of Classification Search
USPC ........ 700/245, 250, 255; 901/2, 8, 19–20, 35; 701/300–302
See application file for complete search history.

(56) References Cited

U.S. PATENT DOCUMENTS

| 7,664,570 | B2 * | 2/2010 | Suita et al. ..................... 700/245 |
| 2006/0292308 | A1 * | 12/2006 | Clifford et al. ............ 427/427.2 |
| 2007/0265731 | A1 * | 11/2007 | Merk et al. ..................... 700/245 |
| 2008/0021597 | A1 * | 1/2008 | Merte et al. ................... 700/255 |

FOREIGN PATENT DOCUMENTS

DE  10 2008 013 431 A1  5/2009

OTHER PUBLICATIONS

Kevin Behnisch, "Safe Collaboration with ABB robots: Electronic Position Switch and SafeMove", ABB Robotics AB, Oct. 2008.*
ABB, Production specification, Articulated Robot IRB 660, Revision G, 2004.*
anianeg, Answer to Effect speed and mass has on stopping distance?, Yahoo! Answers, 4 years ago as of Nov. 5, 2012.*
dr Dragan Kostic, Introduction Robotics, technische universiteit Eindhoven, Sep.-Oct. 2009.*

* cited by examiner

*Primary Examiner* — Khoi Tran
*Assistant Examiner* — Abby Lin
(74) *Attorney, Agent, or Firm* — Wood, Herron & Evans, LLP

(57) ABSTRACT

A method for stopping a manipulator includes the steps of advance simulation of stopping distances for different states and/or braking force profiles of the manipulator, estimating of an upper limit as the stopping distance on the basis of the stopping distances simulated in advance, monitoring a zone, and decelerating the manipulator when a zone is violated, wherein the monitored zone is defined variably during operation on the basis of the stopping distance of the manipulator.

9 Claims, 2 Drawing Sheets

METHOD AND DEVICE FOR STOPPING A MANIPULATOR

TECHNICAL FIELD

Figure 1:
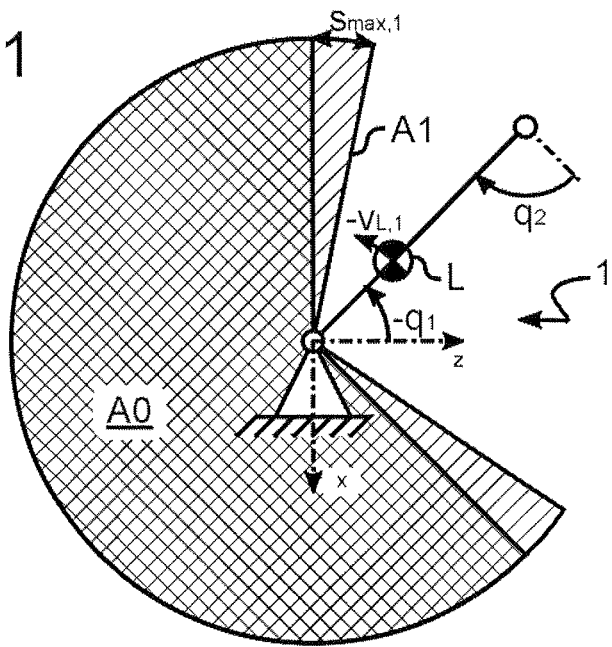

The present invention relates to a method and an apparatus for stopping a manipulator, in particular a robot, as well as for determining a stopping distance of the manipulator.

BACKGROUND

In particular within the framework of safety-critical robot applications, it is known to define protected zones, for example in a world coordinate system, into which the robot must not enter with parts or reference points such as its TCP. If a zone violation is detected, the robot is safely stopped.

But as that happens, the robot can penetrate still further into the protected zone due to its mass inertia and the time delays and inertia between the violation of the zone and the response of the monitoring system.

DE 10 2008 013 431 A1 proposes to determine the maximum available delay time on the basis of the distance of a detected person and the working zone of a machine and the average walking speed of the person, and to choose the braking profile accordingly, in order to stop the machine before the person is exposed to danger. The associated person detection system is very expensive, however.

The object of the present invention is to improve the operation of manipulators.

SUMMARY

According to a first aspect of the present invention, it is proposed that a zone be monitored and that the manipulator be decelerated, preferably safely stopped, when it is detected that it is leaving the monitored zone.

The zone may be defined for example in joint coordinates of the manipulator or in world coordinates, for example a robot cell. To that end it is possible, for example on the basis of its joint coordinates, possibly transformed into world coordinates, to monitor whether or not one or more arms of the manipulator, or fixed reference points on the manipulator such as its TCP, are located inside a prohibited protected zone our outside of a permissible working zone. In the same way, positions of such arms or reference points can also be detected by an apparatus, for example by means of electromagnetic radiation such as visible or UV light, radar, radio or the like, by having for example one or more cameras detect the pose of the manipulator, or by detecting the distance of one or more fixed reference points on the manipulator from transmitters or receivers fixed in the surroundings.

According to the first aspect of the present invention, the monitored zone is now defined variably during operation on the basis of a stopping distance of the manipulator. In particular, the monitored zone can be enlarged for longer stopping distances and/or reduced for shorter stopping distances. Preferably, the stopping distance is determined for that purpose during operation, for example cyclically, and the monitored zone is updated accordingly.

The stopping distance depends in particular on the kinetic energy of the manipulator to be dissipated, which for its part depends on the speeds, masses and moments of inertia of the latter, which in turn can vary depending on the load being moved. In addition, the stopping distance can also be lengthened or shortened by gravity, depending on whether the latter induces additional braking forces and moments or counteracts them with an accelerating effect. Furthermore, differing braking force or moment profiles due to tolerances, wear, heating and the like result in different stopping distances.

Accordingly, according to one embodiment the stopping distance can be determined during operation on the basis of a model which describes the dynamics of the manipulator, in particular its forces of weight and inertia and/or braking force or braking moment profiles. For example, if the mass moment of inertia J with reference to the vertical axis of a single-axis robot with the joint angle q and its constant braking torque $\tau_0$ are known, then the stopping distance s is found on the basis of the dynamic model $$J \times d^2q/dt^2 = -\tau \qquad (1)$$

depending on its initial velocity $\omega$ by time integration to $$s = (J \times \omega^2)/(2 \times \tau_0) \qquad (2).$$

For more complex manipulators, such as six-axis industrial robots, evaluation of a corresponding model for determining the stopping distance $$s = f(q, dq/dt, L) \qquad (3)$$

depending on joint coordinates q, their first time derivative or joint velocity dq/dt and load parameters L, which can include the load mass as well as its moments of inertia and position of center of gravity, is hardly still possible online during operation.

Therefore, according to a second aspect of the present invention, a method explained below for determining a stopping distance of a manipulator, in particular of a robot, is proposed, which is suitable in particular for determining the stopping distance on the basis of a present state during operation, i.e., online. The first and second aspects are preferably combined with each other. However, the first aspect can also be used without the second aspect, as shown by equation (2) above. The second aspect can likewise be used without implementing the first aspect, for example for path planning and optimization, where very many simulation runs must be executed and stopping distances must be determined for various manipulator states.

According to a second aspect of the present invention, stopping distances are simulated in advance, in particular numerically and/or empirically, for various states and/or braking force profiles of the manipulator.

A state may include here for example one or more positions and/or velocities, for example Cartesian positions or velocities of reference points fixed relative to the manipulator in the world coordinate system, or joint coordinates, in particular joint angles, or their time derivatives, load parameters such as in particular mass, moments of inertia and/or position of the center of gravity of the load and the like. A numerical advance simulation can be made in particular by time integration of a dynamic model of the manipulator, as indicated in equation (1) purely as an example, an empirical one by means of test runs and evaluation thereof.

A braking force profile may include for example the magnitude of a braking force as a function of the state, in particular the joint coordinates and/or their time derivatives, the time and/or other parameters such as coefficients of static friction and/or of sliding friction. For a more compact depiction, antiparallel braking force pairs, i.e., braking forces which act on an axis of rotation of the manipulator, are also referred to as a generalization as braking forces. A braking force profile can be specified therefore for example in the form $$\tau_i = \mu_0 \times (dq_i/dt)/|dq_i/dt| + \mu \times (dq_i/dt), \qquad (4)$$

with braking moment $\tau_i$ acting on axis i and the coefficients of static and sliding friction $\mu_0$, $\mu < 0$. Instead of different braking force profiles, the same braking force profile may be used in each case for the variation of states, for example, a minimal braking force profile for each axis, so as to guarantee that the actual braking force profile is higher, and the actual stopping distance is consequently always shorter than the simulated distance.

According to the invention, an upper limit for the stopping distance is then estimated on the basis of these previously simulated stopping distances. This occurs, in particular in the case of combination with the first aspect, during operation of the manipulator, preferably essentially in real time.

Because of the estimation of an upper limit according to the invention, it is possible to dispense with the complicated exact evaluation of the dynamic model or corresponding test runs when it is necessary to determine the present stopping distance. For example, for a current state one or more nearest simulated states may be used, and an upper limit for the current state may be estimated from the stopping distances determined for those states, for example by interpolation or extrapolation.

It is already evident from the greatly simplified example with a vertical axis of rotation explained above, that the stopping distance depends in part on inertial parameters of a load carried by the manipulator, in equation (1) on the moment of inertia J. These vary depending on the load being moved, for example the payload grasped, different tools, etc.—sometimes greatly.

Therefore, in a preferred embodiment of the present invention, the stopping distance is simulated for different states of the manipulator for a reference load and/or reference load arrangement. A reference load may be predefined accordingly, for example by values for mass and moments of inertia, a reference load arrangement corresponding for example through the position of the center of gravity to the TCP or the axes of motion of the manipulator.

If an actual load deviates in operation too severely from the reference load used as the basis in advance simulations, this falsifies the upper limit for the stopping distance, with the consequence that the latter becomes longer than necessary or too short. Therefore, in a preferred refinement, a stopping distance that was simulated in advance for a reference load and/or reference load arrangement is scaled to an actual load and/or load arrangement, in order to estimate the upper limit.

This may be done for example by simulating a scaling value on the one hand for the reference load and/or for the reference load arrangement, and on the other hand for the actual load or load arrangement, and using the quotients of both scaling values to form a scaling factor by which the estimated stopping distance is for example multiplied.

Since, when the estimation is done on the basis of a reference load and scaling of the stopping distance using one or more scaling factors, there is not yet any guarantee that the stopping distance with an actual load will not exceed the upper limit thus estimated, in a preferred refinement stopping distances for different states of the manipulator are additionally simulated in advance for one or more loads or load arrangements that differ from the reference load and/or reference load arrangement. If a longer stopping distance is found in this process than the one produced on the basis of the reference load and the scaling, the upper limit is raised accordingly. To this end it is likewise also possible, using the inverse of the scaling factor(s), to depict the stopping distance that was simulated for the load (arrangement) that differed from the reference load (arrangement) on the stopping distance for the reference load (arrangement), and thus to treat it as another simulation run with a reference load (arrangement).

For example, for a conventional six-axis articulated arm robot, a state vector of its joint angles and joint angle speeds already has 12 dimensions. In a preferred embodiment of the present invention, a multidimensional state of the manipulator is therefore mapped onto or transformed to a value or total speed, in particular scalar, having fewer dimensions. To this end, it is possible for example to form a weighted sum of numerical values or powers of the joint speeds. Since the stopping distance is heavily dependent on the kinetic energy of the manipulator, and this results for articulated arm robots from the sum of the moments of inertia around the individual axes, multiplied by half the squares of the corresponding joint angle speeds, in a preferred embodiment the state given by the joint coordinates and their first time derivative is transformed to a scalar total speed which corresponds essentially to the kinetic energy in this state, where it is also possible, for the sake of simplification, to assume maximum values for load parameters such as moments of inertia and/or distances between centers of gravity.

In particular, if a multidimensional state of the manipulator is transformed to a scalar total speed to estimate the upper limit, it is possible to select the longest stopping distance, from all of the simulations for various states of the manipulator that are transformed to the same scalar total speed within a prescribed descretization or tolerance, as the upper limit for this scalar total speed. The maximum stopping distance can then be stored for example using a traverse over the scalar total speed.

In a preferred embodiment, the advance simulations are conducted on a type-specific basis for various manipulators which differ in their configuration, for example axis arrangement, axis intervals, masses, moments of inertia and other machine data. The stopping distance for a particular manipulator is then determined on the basis of the stopping distances simulated in advance for that type of manipulator.

Figure 2:
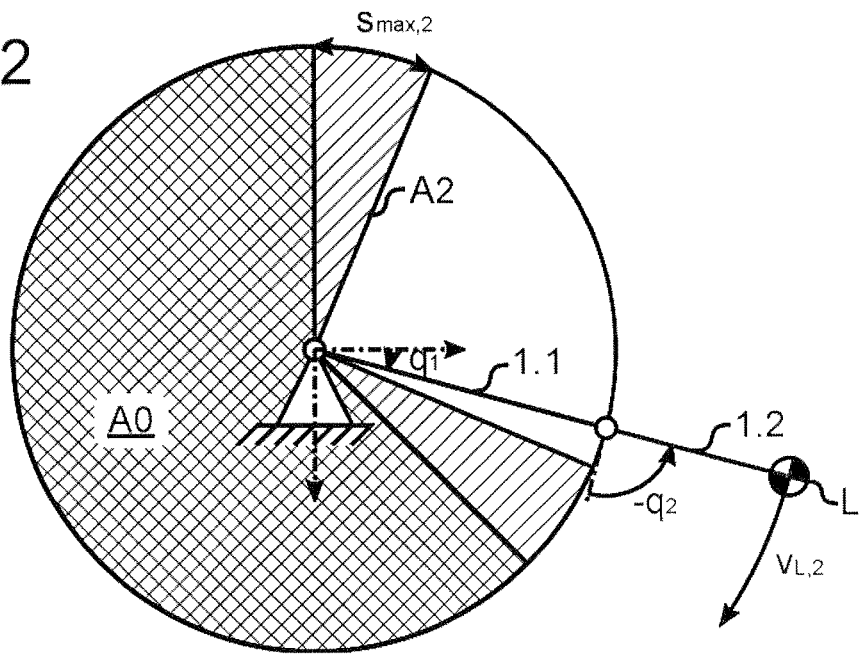

Additional advantages and features result from the subordinate claims and the exemplary embodiments. To this end the drawing shows the following, partially in schematic form:

FIGS. 1, 2: Protected zones of a robot that are defined according to one embodiment of the present invention, and FIG. 3: the sequence of a method according to the invention, for defining the protected zones in FIGS. 1, 2.

For a better overview, the present invention will now be explained on the basis of a simplified example. To this end, FIGS. 1, 2 show a biaxial articulated-arm robot 1, having two arms 1.1, 1.2 (see FIG. 2) which are connected together through rotating joints, whose joint angles $q_1$ and $q_2$ are adjustable via drives, in order to move a load L whose parameters of inertia, in particular mass m, center of gravity position $r_{TCP,L}$ and moments of inertia or inertial tensors $J_L$ are known in reference to the tool center points TCP.

DETAILED DESCRIPTION

In FIG. 1 robot 1 moves load L at Cartesian speed $v_{L,1}$ counterclockwise upward (v<0) on a circular path with arm 1.2 folded in ($q_2=90°$), in FIG. 2 with arm 1.2 unfolded, downward and at a higher angular speed $dq_1/dt$.

In order to protect operating personnel and equipment and to avoid self-collisions, a protected zone A0 which is indicated in the figures with cross-hatching is defined, in a world coordinate system which is situated in the base of robot 1 and is plotted in dashed-dotted lines in FIGS. 1, 2, into which robot 1 is not allowed to intrude, for example with its TCP or with one of its arms 1.1, 1.2. If it is found, for example on the basis of the joint angle $q=(q_1, q_2)$, that robot 1 is violating protected zone A0, it is decelerated and safely stopped.

To prevent another penetration of robot 1 into protected zone A0 after it has violated the boundary of the latter, the protected zone is enlarged on the basis of a maximum stopping distance $s_{max}$ of the robot. In FIGS. 1, 2, as an example, protected zone A0 in the form of a circle segment is expanded symmetrically at each of its two radii facing the permissible working space of robot 1 (on the right in FIGS. 1, 2) by hatched circle segments A1 (FIG. 1) or A2 (FIG. 2), whose angular extent depends on the maximum stopping distance $s_{max,1}$ or $s_{max,2} > s_{max,1}$ of robot 1. In another embodiment, not shown, the enlargement depends on the motion state of the robot, for example only at outer sides of the protected zone, whose outward-directed normal line encloses an angle greater than 90° with the speed of the TCP or of a robot arm, or which are approached by a part of the robot, i.e., by adding only the upper circle segment in FIG. 1, by adding the lower circle segment in FIG. 2.

It can be seen from the simplified example that the maximum stopping distance depends on the state of the robot: While its kinetic energy that needs to be neutralized when decelerating is less in FIG. 1, the stopping distance becomes greater in FIG. 2 because of the unfolded arm, the higher angular speed $dq_1/dt$ and the supportive effect of gravity.

Figure 3:
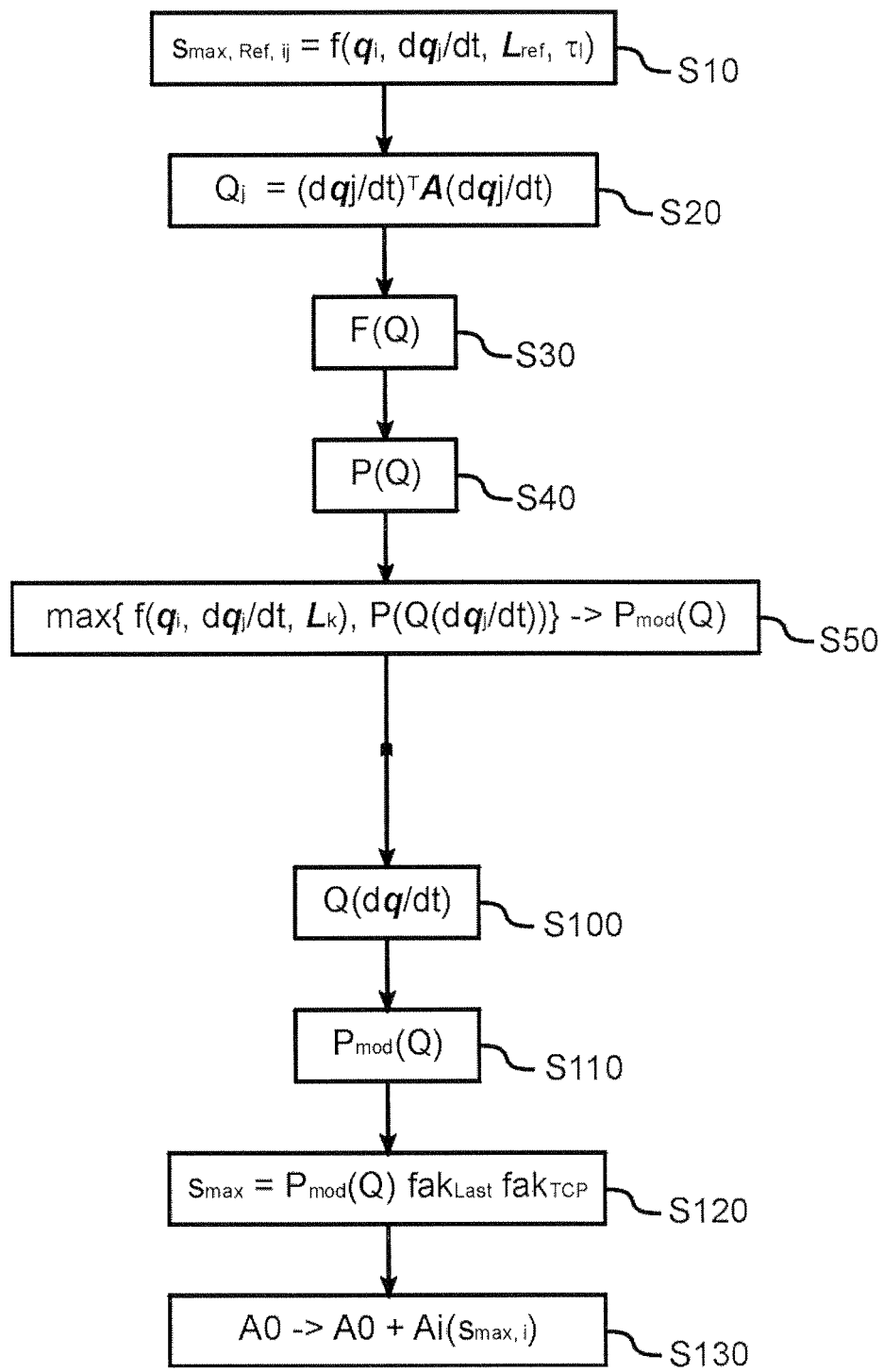

An upper limit for the stopping distance $s_{max}$ is therefore estimated online during operation depending on the state of robot 1, corresponding to a method depicted in FIG. 3.

To this end, the respective maximum stopping distances are determined or estimated offline in advance for various robot types, for example the biaxial robot sketched in FIGS. 1, 2 with arms 1.1, 1.2 of known length and mass distribution, in each case for a reference load $L_{ref}$ in a reference arrangement in a step S10 for various joint angles $q_i$ and joint speeds $dq_j/dt = (dq_1{}^i/dt, dq_2{}^j/dt, \ldots)$ on the basis of a dynamic model of the robot, preferably allowing for various axis braking moment profiles $\tau_l (q, dq/dt, t)$, or with a fixed braking moment profile for each axis that is the same for all variations of the state:

$$s_{max,ref,ij} = f(q_i, dq_j/dt, L_{ref}, \tau_l); i=1, 2, \ldots; j=1, 2, \ldots;$$
$$l=1, 2, \ldots \quad (5)$$

Alternatively, these maximum stopping distances may also be determine empirically.

These joint angle speeds $dq_j/dt$ are also mapped onto a scalar total speed $Q_j$, which is proportional to the sum of weighted powers of the individual joint angle speeds $dq_k/dt$ (step S20):

$$Q_j = a_1 \times \left(\frac{dq_1^j}{dt}\right)^2 + a_2 \times \left(\frac{dq_2^j}{dt}\right)^2 + \ldots \quad (6)$$
$$= \left(\frac{dq^j}{dt}\right)^T \times A \times \left(\frac{dq^j}{dt}\right)$$

Then, in a step S30, the maximum one of the simulated stopping distances $s_{max, ref, ij}$ is selected from among all the simulated joint angle speeds $dq/dt$ that are mapped onto the same total speed Q within a predefined descretization $\delta$:

$$F(x) = \max\{f(q_i, dq_j/dt, L_{ref}) | Q(dq_j/dt) = x \pm \delta\} \quad (7)$$

where "max{Y(x)|Z(x)=X}," according to conventional usage in the field, designates the maximum of all values Y whose argument x has the property Z(x)=X.

In a step S40, these maximum stopping distances F referenced to the scalar total speed Q are now mapped to a traverse P that always has at least the maximum value of all maximum stopping distances F in a discretization interval $Q_k \leq Q \leq Q_{k+1}$, so that the following is true:

$$Q_k \leq Q \leq Q_{k+1} \Rightarrow P(Q) \geq F(Q). \quad (8)$$

This traverse thus supplies an easily evaluatable estimate for the maximum stopping distance of a robot of the underlying type with a reference load $L_{ref}$ in a reference arrangement.

To estimate the maximum stopping distance that occurs in operation, this value is still scaled from the reference values to the actual load and its arrangement. To this end, the value is multiplied on the one hand by a scaling factor $fak_{Last}$, which is derived from the quotient of the values according to (6) based on actual load parameters, divided by values according to (6) based on the reference load parameter. To make this evaluation easier, maximum values are chosen for the distance of the center of gravity of the load from the individual axes of motion of the robot, for example $J_{y,L} + (I_{TCP} + I_{1.1} + I_{1.2})^2 \times m_L$, using the moment of inertia $J_{y,L}$ of the load at its center of gravity, the distance $I_{TCP}$ from the latter to the flange of the robot, the lengths of its arms $I_{1.1}$, $I_{1.2}$ and the mass $m_L$ of the payload.

In addition, the value is multiplied by a scaling factor $fak_{TCP}$, which is derived from the quotients of an auxiliary function for the geometric masses of the actual TCP, divided by the same auxiliary function for the masses of a reference TCP, where the auxiliary function for its part corresponds to the sum of the quotients of the distance of the TCP from an axis, multiplied by the square of its speed, divided by the angular acceleration of that axis, taken over all the axes of the robot.

Finally, in a step S50, simulations are conducted offline with various loads and load arrangements $L_k$, and the maximum stopping distances obtained thereby are scaled back to the reference load or reference load arrangement by dividing them by the scaling factors $fak_{Last}$, $fak_{TCP}$ explained above. If that results in a higher value for one or more total speeds than the traverse determined on the basis of the reference load or reference load arrangement, the latter is modified accordingly to $P_{mod}$, so that it always has these higher values in intervals in which the simulations with loads and load arrangements that differ from the reference configurations result in greater maximum stopping distances. Alternatively, the simulations with various loads and load arrangements $L_k$ may also be conducted before, together with or after steps S10, S20, and then furnish additional stopping distances F(Q), referenced to the reference load by being scaled back, which are used in step S40 when forming the traverse P(Q).

An upper limit for the maximum stopping distance $s_{max}$ is now estimated in online operation. To this end, the present total speed Q for the present state is determined according to (5) in a cyclically repeated step S100, this total speed Q is used in step S110 to determine a maximum reference stopping distance from the modified traverse $P_{mod}(Q)$, and this maximum reference stopping distance is multiplied by the scaling factors $fak_{Last}$, $fak_{TCP}$ in a step 120. On the basis of the maximum stopping distance $s_{max}$ estimated in this way, in a step S130 the protected zone A0 is expanded in the manner explained at the beginning, the angle of the expanded circle segment A1 or A2 being chosen for example in proportion to the maximum stopping distance $s_{max}$.

In the exemplary embodiment, the higher kinetic energy due to the unfolded arm and the greater Cartesian speed $v_{L,2}$ and the accelerating gravity component of the configuration depicted in FIG. 2 results in a greater estimated maximum stopping distance $s_{max}$, and thus in a greater enlargement A2 of protected zone A0 than in the case of the configuration depicted in FIG. 1, with the arm folded in and an additional decelerating gravity component. That ensures that the robot comes to a stop before the actual protected zone A0 if it oversteps the upper limit of zone A1 in the state of FIG. 1, the lower limit of zone A2 in the state of FIG. 2.

In this way it is possible to estimate an upper limit for the maximum stopping distance and to enlarge the protected zone on the basis of this estimate, in a way that can be evaluated quickly and simply by computer.

REFERENCE LABELS 1 robot
1.1, 1.2 robot arms
A0, A1, A2 protected zone
L payload
$s_{max}$ maximum stopping distance
$q_1, q_2$ joint angle

What is claimed is:

1. A method for controlling a robotic manipulator, comprising:
    during operation of the manipulator, establishing a boundary of a protected zone on the basis of a stopping distance value, wherein the stopping distance value varies as a function of dynamics of the robotic manipulator;
    monitoring the protected zone with a controller; and
    in response to the manipulator entering the protected zone, decelerating the manipulator.

2. The method of claim 1, further comprising:
    prior to operation of the manipulator, simulating a plurality of stopping distance values, each distinct stopping distance value being associated with a distinct state of at least one of the manipulator's simulated position, movement, load, or braking force profile; and
    prior to the operation of the manipulator, calculating a maximum stopping distance value on the basis of more than one of the plurality of simulated stopping distance values.

3. The method of claim 2, wherein each of the stopping distance values used as a basis for calculating the maximum stopping distance value are simulated using a reference load.

4. The method of claim 3, wherein the reference load differs from the manipulator's actual load during operation of the manipulator, and wherein the maximum stopping distance value is calculated using a ratio between the actual load and the reference load.

5. The method of claim 3, further comprising:
    simulating stopping distance values using a load different than the reference load.

6. The method of claim 2, wherein simulating the plurality of stopping distance values further comprises:
    transforming a multi-dimensional state of the manipulator into a variable having fewer dimensions; and
    associating one of the plurality of stopping distance values with the variable.

7. The method of claim 6, wherein the variable having fewer dimensions is a scalar speed value.

8. A robotic manipulator, comprising:
    at least one movable arm; and
    a control, the control operative to:
        establish a protected zone proximate the robotic manipulator on the basis of a maximum stopping distance value of the at least one arm wherein the protected zone is varied, and the maximum stopping distance value varies as a function of dynamics of the manipulator,
        monitor the protected zone, and
        in response to the at least one arm entering the protected zone, decelerate the manipulator.

9. A program product, comprising:
    a non-transient computer-readable medium; and
    program code stored on the computer readable medium and configured to control a robotic manipulator;
    the program code configured to establish a boundary of a protected zone on the basis of a maximum stopping distance value during operation of the robotic manipulator, wherein the maximum stopping distance value varies as a function of dynamics of the robotic manipulator, and
    the program code further configured to monitor the protected zone and to decelerate the manipulator in response to the manipulator entering the protected zone.

* * * * *

UNITED STATES PATENT AND TRADEMARK OFFICE
CERTIFICATE OF CORRECTION

Page 1 of 1

PATENT NO.        : 8,583,285 B2
APPLICATION NO.   : 12/875351
DATED             : November 12, 2013
INVENTOR(S)       : Andreas Aurnhammer et al.

It is certified that error appears in the above-identified patent and that said Letters Patent is hereby corrected as shown below:

In the Specification:

Column 1
Lines 43-44 read "located inside a . . . our outside of a" and should read -- located inside a . . . or outside a --.

Column 4
Line 38 reads "the drawing shows" and should read -- the drawings show --.

Column 5
Line 60 reads "within a predefined descretization" and should read -- with in predefined discretization --.

In the Claims:

Claim 3, Column 7
Lines 38-40 read "wherein each of the stopping distance values used as a . . . are simulated using a reference load" and should read -- wherein each of the stopping distance values used as a . . . is simulated using a reference load --.

Signed and Sealed this
Sixth Day of May, 2014

Michelle K. Lee
*Deputy Director of the United States Patent and Trademark Office*